United States Patent
Kazami

(10) Patent No.: US 8,532,477 B2
(45) Date of Patent: Sep. 10, 2013

(54) LENS CONTROL DEVICE HAVING LENS POSITION CONTROL FUNCTION FOR BRINGING, METHOD OF CONTROLLING THE SAME, AND STORAGE MEDIUM

(75) Inventor: Yusuke Kazami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 13/015,841

(22) Filed: Jan. 28, 2011

(65) Prior Publication Data

US 2011/0188129 A1    Aug. 4, 2011

(30) Foreign Application Priority Data

Feb. 3, 2010  (JP) .................................. 2010-022090

(51) Int. Cl.
*G03B 17/00*    (2006.01)

(52) U.S. Cl.
USPC ............................................... 396/77; 396/82

(58) Field of Classification Search
USPC ...................... 396/77–82; 348/347
See application file for complete search history.

(56) References Cited

U.S. PATENT DOCUMENTS

| 5,805,939 | A * | 9/1998 | Hamamura et al. | 396/123 |
| 2002/0135693 | A1* | 9/2002 | Ohkawara et al. | 348/347 |
| 2009/0046199 | A1* | 2/2009 | Nanjo | 348/347 |
| 2011/0176795 | A1* | 7/2011 | Won et al. | 396/133 |
| 2012/0307134 | A1* | 12/2012 | Morimoto | 348/360 |

FOREIGN PATENT DOCUMENTS

| JP | 09-005604 | 1/1997 |
| JP | 2790812 | 8/1998 |

* cited by examiner

*Primary Examiner* — Christopher Mahoney
(74) *Attorney, Agent, or Firm* — Cowan, Liebowitz & Latman, P.C.

(57) ABSTRACT

A lens control device which is capable of controlling lens positions such that an in-focus state of an object image can be maintained even when a variable power lens is positioned outside a normal zoom range from a wide-angle end to a telephoto end. A flash memory stores a positional relationship between the variable power lens and a focus lens, on an object distance-by-object distance basis. A system controller controls the movement of the focus lens by calculating the in-focus position of the focus lens with respect to the position of the variable power lens based on the positional relationship stored in the flash memory when the variable power lens is moved to a position outside the normal zoom range defined in the positional relationship stored in the flash memory.

5 Claims, 4 Drawing Sheets

LENS CONTROL DEVICE HAVING LENS POSITION CONTROL FUNCTION FOR BRINGING, METHOD OF CONTROLLING THE SAME, AND STORAGE MEDIUM

BACKGROUND OF THE INVENTION

1. Field of the Invention

The present invention relates to a lens control device equipped with a zooming lens mechanism, a method of controlling the lens control device, and a storage medium, and more particularly to a lens control device having a lens position control function for focusing, a method of controlling the lens control device, and a non-transitory computer-readable storage medium.

2. Description of the Related Art

Conventionally, as one of variable power systems used in a digital camera, a video camera, and so forth, there has been proposed e.g. a lens system LS which forms a zooming lens mechanism configured as shown in a part surrounded by a broken line in FIG. 1. This lens system LS is constructed by arranging, with respect to an image pickup device 4, a variable power lens 1 for performing magnification (including reduction) of an object image, a focus lens 2 having both of a focus adjustment function and a so-called compensator function for correcting deviation of a focal plane due to the magnification, and a diaphragm 3, in the mentioned order from an object side.

In the lens system LS configured as shown in the part of FIG. 1, the focus lens 2 has both of the compensator function and the focus adjustment function. Therefore, in this lens system LS, even when focal lengths are equal, the positional relationship between the variable power lens 1 and the focus lens 2 for focusing an object image on the imaging surface of the image pickup device 4 can vary depending on an object distance. Further, in the lens system LS, even if object distances are equal, when the focal length is changed by a zooming operation (a magnification operation), the position of the focus lens 2 for focusing on the imaging surface becomes different.

Further, in the lens system LS configured as shown in the part of FIG. 1, the variable power lens 1 is driven, as shown in FIG. 5, for a zooming operation, and at the same time, the movement of the position of the focus lens 2 is controlled so as to focus an object image on the imaging surface. In FIG. 5, the horizontal axis represents the variable power lens position (corresponding to focal length) and the vertical axis represents the focus lens position (corresponding to object distance), and the position of the focus lens 2 (focus lens position) is continuously plotted on an object distance-by-object distance basis, whereby the positional relationship between the variable power lens 1 and the focus lens 2 in the in-focus state is illustrated.

In the above-described lens control device, during the zooming operation, a trajectory of the focus lens position, which corresponds to the present object distance, is selected from those shown in FIG. 5, and the focus lens 2 is driven according to the trajectory, whereby a zooming operation with no blur is carried out.

In general, in the image pickup apparatus using the above-described lens system LS, to cause the lens system LS to perform the zooming operation while maintaining the in-focus state of an object image, it is a general practice to store information on the trajectories (hereinafter referred to as the "cam trajectories") as shown in FIG. 5 in advance in some form or other in a lens control microcomputer, and perform zooming by reading out trajectory information corresponding to the present position of the variable power lens 1 and moving the focus lens 2 based on the trajectory information.

Further, in the conventional image pickup apparatus, there has been proposed a method of storing in advance respective positions of the focus lens 2 where focus can be achieved at a plurality of positions of the variable power lens 1 spaced from each other, according to each object distance, and calculating a focus lens position where focus can be achieved at the current variable power lens position during the zooming operation, based on the relationship between the current position of the variable power lens 1 and a stored position of the variable power lens 1 adjacent to the current variable power lens position (see Japanese Patent Registration No. 02790812 and Japanese Patent Laid-Open Publication No. H09-005604).

However, in the above-described conventional method of calculating a focus lens position where focus can be achieved at the current variable power lens position using the stored variable power lens positions, each stored cam trajectory is limited to a range wherein the focus lens position can be set according to the zooming operation of the variable power lens 1.

More specifically, the conventionally proposed method is for calculating a focus lens position in a range from a wide-angle end to a telephoto end of the variable power lens position, and therefore cannot cope with e.g. a hatched area in FIG. 6, beyond the telephoto end.

Actually, however, the variable power lens position is sometimes displaced toward a super wide-angle position beyond the wide-angle end or toward a super telephoto position beyond the telephoto end, i.e. into the hatched area appearing in FIG. 6, due to a position control error of the variable power lens position, such as a stopping error of the variable power lens 1, an attitude error of the lens system, etc.

In this case, when the position control of the focus lens 2 is performed by the above-described conventional method, since there is no cam trajectory at the super telephoto position, a focus lens position associated with the stored telephoto end has to be selected. That is, if the degree of the stop position error of the variable power lens 1 is large, it is impossible to achieve focus when zoomed to the vicinity of the telephoto end. The same problem also occurs with the wide-angle side.

SUMMARY OF THE INVENTION

The present invention provides a lens control device which is capable of controlling lens positions such that an in-focus state of an object image can be maintained even when a variable power lens is positioned outside a normal zoom range thereof from a wide-angle end to a telephoto end, a method of controlling the lens control device, and a non-transitory computer-readable storage medium.

In a first aspect of the present invention, there is provided a lens control device that controls movement of a first lens by a first drive unit to vary magnification of an object image, and controls movement of a second lens by a second drive unit to correct a change in an image forming position caused by the movement of the first lens, comprising a storage unit configured to store a positional relationship between the first lens and the second lens, on an object distance-by-object distance basis, and a system controller configured to be operable when the first lens is moved to a position outside a normal zoom range of the first lens defined by a wide-angle end and a telephoto end in the positional relationship stored in the storage unit, to calculate an in-focus position of the second lens with respect to the position of the first lens outside the normal zoom range based on the stored positional relationship, and cause the second drive unit to move the second lens to the in-focus position.

In a second aspect of the present invention, there is provided a method of controlling a lens control device that stores a positional relationship between a first lens for varying magnification of an object image and a second lens for correcting a change in an image forming position caused by a movement of the first lens, on an object distance-by-object distance basis, in a storage unit, and controls respective movements of the first and second lenses, the method comprising calculating, when the first lens is moved to a position outside a normal zoom range of the first lens defined by a wide-angle end and a telephoto end in the positional relationship stored in the storage unit, an in-focus position of the second lens with respect to the position of the first lens outside the normal zoom range based on the stored positional relationship, thereby causing the second drive unit to move the second lens to the in-focus position.

In a third aspect of the present invention, there is provided a non-transitory computer-readable storage medium storing a computer-executable program for causing a computer to execute a method of controlling a lens control device that stores a positional relationship between a first lens for varying magnification of an object image and a second lens for correcting a change in an image forming position caused by a movement of the first lens, on an object distance-by-object distance basis, in a storage unit, and controls respective movements of the first and second lenses, wherein the method comprises calculating, when the first lens is moved to a position outside a normal zoom range of the first lens defined by a wide-angle end and a telephoto end in the positional relationship stored in the storage unit, an in-focus position of the second lens with respect to the position of the first lens outside the normal zoom range based on the stored positional relationship, thereby causing the second drive unit to move the second lens to the in-focus position.

According to the present invention, in the lens control device including the first lens for varying magnification of an object image and the second lens for correcting a change in an image forming position caused by the movement of the first lens, it is possible to control lens positions such that the in-focus state of an object image can be maintained even when the first lens is positioned outside the range from the wide-angle end to the telephoto end.

Further features of the present invention will become apparent from the following description of exemplary embodiments with reference to the attached drawings.

DETAILED DESCRIPTION OF THE EMBODIMENTS

The present invention will now be described in detail below with reference to the accompanying drawings showing embodiments thereof.

Figure 1:
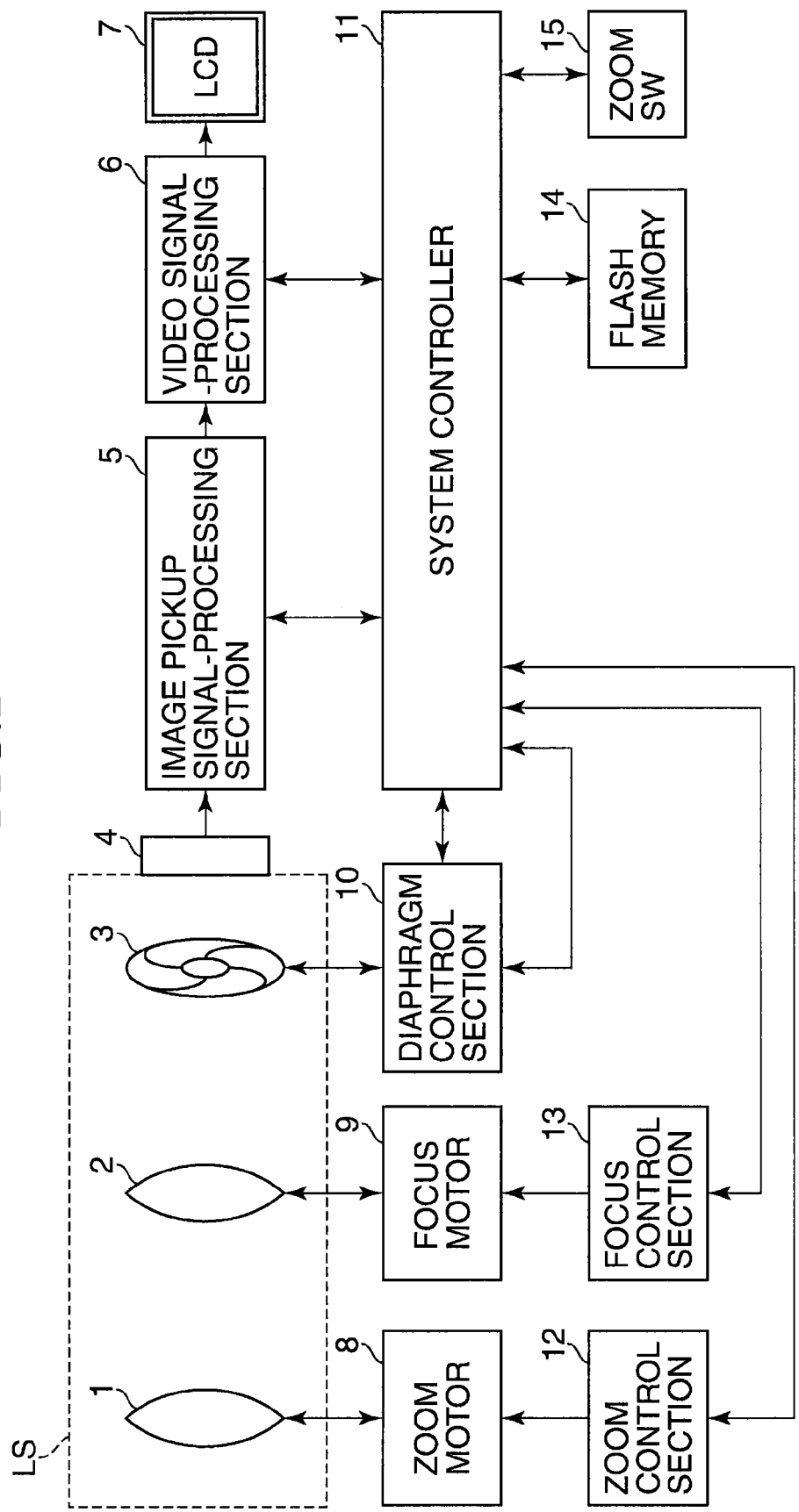
FIG. 1 is a block diagram of a digital camera including a lens control device according to an embodiment of the present invention.

FIG. 1 is a block diagram of a digital camera including a lens control device according to a first embodiment of the present invention. In FIG. 1, reference numeral 1 denotes a variable power lens (a first lens) for performing zooming (magnification (including reduction)) of an object image as a component of a lens system LS, and the variable power lens 1 may be formed by a group of a plurality of lenses). Further, in FIG. 1, reference numeral 2 denotes a focus lens (a second lens) having both of a compensator function and a focusing function as a component of the lens system LS, which may be formed by a group of a plurality of lenses, and reference numeral 3 denotes a diaphragm. In the lens system LS forming a zooming lens mechanism, the variable power lens 1, the focus lens 2 and the diaphragm 3 are arranged in the mentioned order from the side of an object.

More specifically, in this lens system LS for the zooming lens mechanism, the magnification of the object image is performed by controlling the movement of the variable power lens 1 using a zoom motor 8 (a first drive unit) and at the same time the in-focus state of an object image is maintained by controlling the movement of the focus lens 2 using a focus motor 9 (a second drive unit) to correct a change in an image forming position caused by the movement of the variable power lens 1.

Image light having passed through the lens system LS configured as above forms an image on an imaging surface of an image pickup device 4. The image is photoelectrically converted by the image pickup device 4 to an image pickup signal, and the image pickup signal is delivered to an image pickup signal-processing section 5.

The image pickup signal-processing section 5 sets a method for reading out signal charges from the image pickup device 4. Further, the image pickup signal-processing section 5 sets a shutter speed for determining charge accumulation time and a gain for amplifying the image pickup signal delivered from the image pickup device 4. The image pickup signal processed by the image pickup signal-processing section 5 is delivered to a video signal-processing section 6.

The video signal-processing section 6 performs predetermined signal processing on the image pickup signal delivered from the image pickup signal-processing section 5 using a signal processing circuit, not shown, incorporated therein, and converts the image pickup signal to a standardized video signal. The video signal formed by the video signal-processing section 6 is delivered to an LCD (Liquid Crystal Display) 7 as an electronic view finder, and is displayed as the object image. Further, at this time, a variable power ratio for indicating a zoomed state is displayed on the LCD 7 according to the current position of the variable power lens 1.

On the other hand, the image pickup signal generated by the image pickup signal-processing section 5 is also delivered to a system controller 11. The system controller 11 adjusts the amount of light by controlling the amount of opening of the diaphragm 3 via a diaphragm control section 10 according to the input level of the video signal.

A zoom switch (SW) 15 as a member of a console section, not shown, is connected to the system controller 11. The zoom switch 15 is formed as a unit which causes a voltage dependent on the rotational angle or the pushing amount of an operation member thereof to be output, and variable speed zooming is performed according to the output voltage.

The system controller 11 reads operating information on the zoom switch 15 as an instruction signal subjected to A/D conversion, and drivingly controls the variable power lens 1 according to an instruction represented by the instruction signal via a zoom control section 12.

To this end, the system controller 11 outputs the drive commands for driving the variable power lens 1 and the focus lens 2 to the zoom control section 12 and a focus control section 13, respectively. The zoom control section 12 and the focus control section 13 deliver drive energies to the zoom motor 8 and the focus motor 9 according to the respective drive commands input thereto, whereby the zoom motor 8 and the focus motor 9 are driven to move the variable power lens 1 and the focus lens 2 to their respective desired positions.

Next, a detailed description will be given of a method of drivingly controlling the zoom motor 8 and the focus motor 9 when the zoom motor 8 for driving the zoom lens is a DC motor and the focus motor 9 for driving the focus lens is a stepper motor.

The system controller 11 determines the respective driving speeds of the zoom motor 8 and the focus motor 9 by program processing, and sends the determined driving speeds to the zoom control section 12 for driving the zoom motor 8 and the focus control section 13 for driving the focus motor 9, respectively.

Further, the system controller 11 sends not only the drive commands but also stop commands for stopping the zoom motor 8 and the focus motor 9 and rotational direction commands for instructing the rotational directions of the motors 8 and 9, to the zoom control section 12 and the focus control section 13, respectively.

The system controller 11 determines the drive or stop command (signal) and the rotational direction command (signal) for the zoom motor 8 mainly according to the state of the zoom switch 15.

Further, the system controller 11 determines the drive or stop command (signal) and the rotational direction command (signal) for the focus motor 9 through processing by the system controller 11 mainly during a zooming operation and an AF (Auto Focus) operation.

Figure 5:
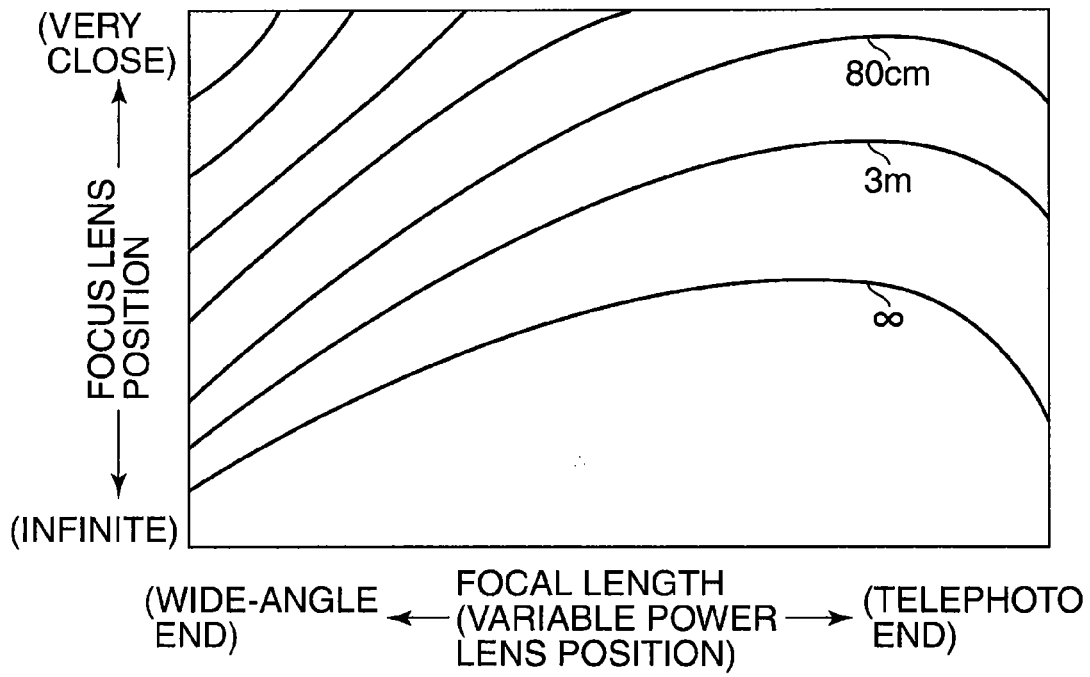
FIG. 5 is a diagram useful in explaining cam trajectories which represents a position of a focus lens position where focus is achieved at each associated position of a variable power lens, on an object distance-by-object distance basis.
Figure 6:
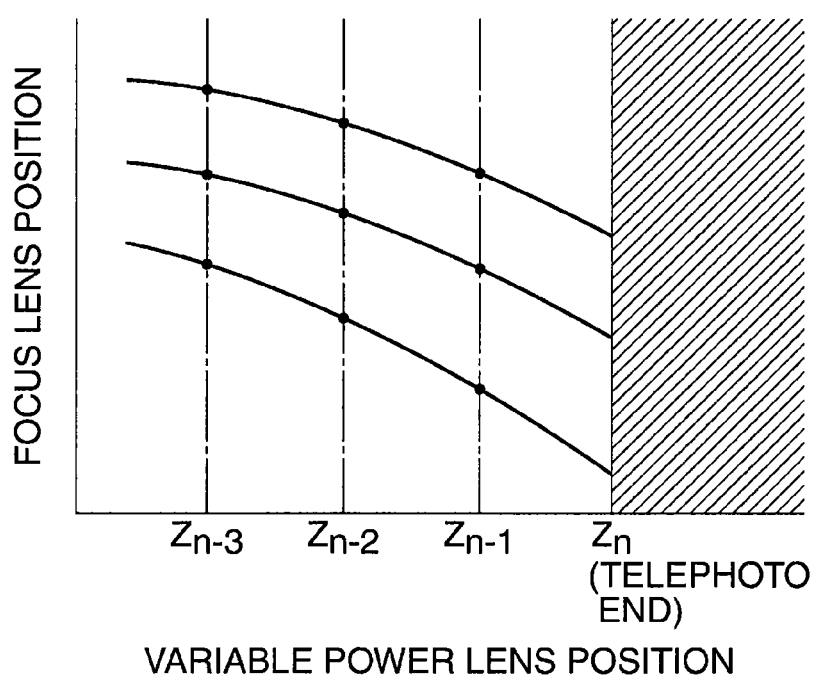
FIG. 6 is a view showing a normal zoom range within which a variable power lens can be moved according to cam trajectories stored in a memory of the digital camera.

A flash memory 14 is connected to the system controller 11. The flash memory 14 stores focus lens movement control information based on cam trajectories within a preset movable range of the variable power lens 1 from a preset wide-angle end to a preset telephoto end thereof, as illustrated in FIGS. 5 and 6 (hereinafter referred to as "the normal zoom range").

The focus lens movement control information stored in the flash memory 14 is formed by dividing the normal zoom range of the variable power lens 1 from the wide-angle end to the telephoto end thereof into n sections, determining, on an object distance-by-object distance basis, a cam trajectory defined by a combination of (n+1) variable power lens positions which define boundaries of the n sections and respective focus lens positions where focus is achieved at the (n+1) variable power lens positions, and storing the thus-defined positional relationships between the variable power lens 1 and the focus lens 2 with respect to each object distance, as a map.

Further, in the first embodiment, the flash memory 14 stores, for each object distance, information on a focus lens position associated with a variable power lens position in a super-wide region beyond the wide-angle end of the normal zoom range of the variable power lens 1 and information on a focus lens position associated a variable power lens position in a super-telephoto region beyond the telephoto end of the normal zoom range of the variable power lens 1.

More specifically, the flash memory 14 stores in-focus position information formed by combining the two variable power lens positions outside the normal zoom range of the variable power lens 1 with focus lens positions (in-focus positions of the focus lens 2) where focus can be achieved at the respective variable power lens positions (the thus defined in-focus position information is hereinafter referred to as the "outside-zoom-range in-focus position information).

Here, the width between a position of the variable power lens 1 set by the outside-zoom-range in-focus position information and a position of the variable power lens 1 at the wide-angle end or the telephoto end is set to be larger than the width (division width) between adjacent ones of the positions of the variable power lens 1 defining the cam trajectories. It should be noted that the outside-zoom-range in-focus position information is stored on an object distance-by-object distance basis, similarly to the focus lens movement control information based on the cam trajectories.

Figure 2:
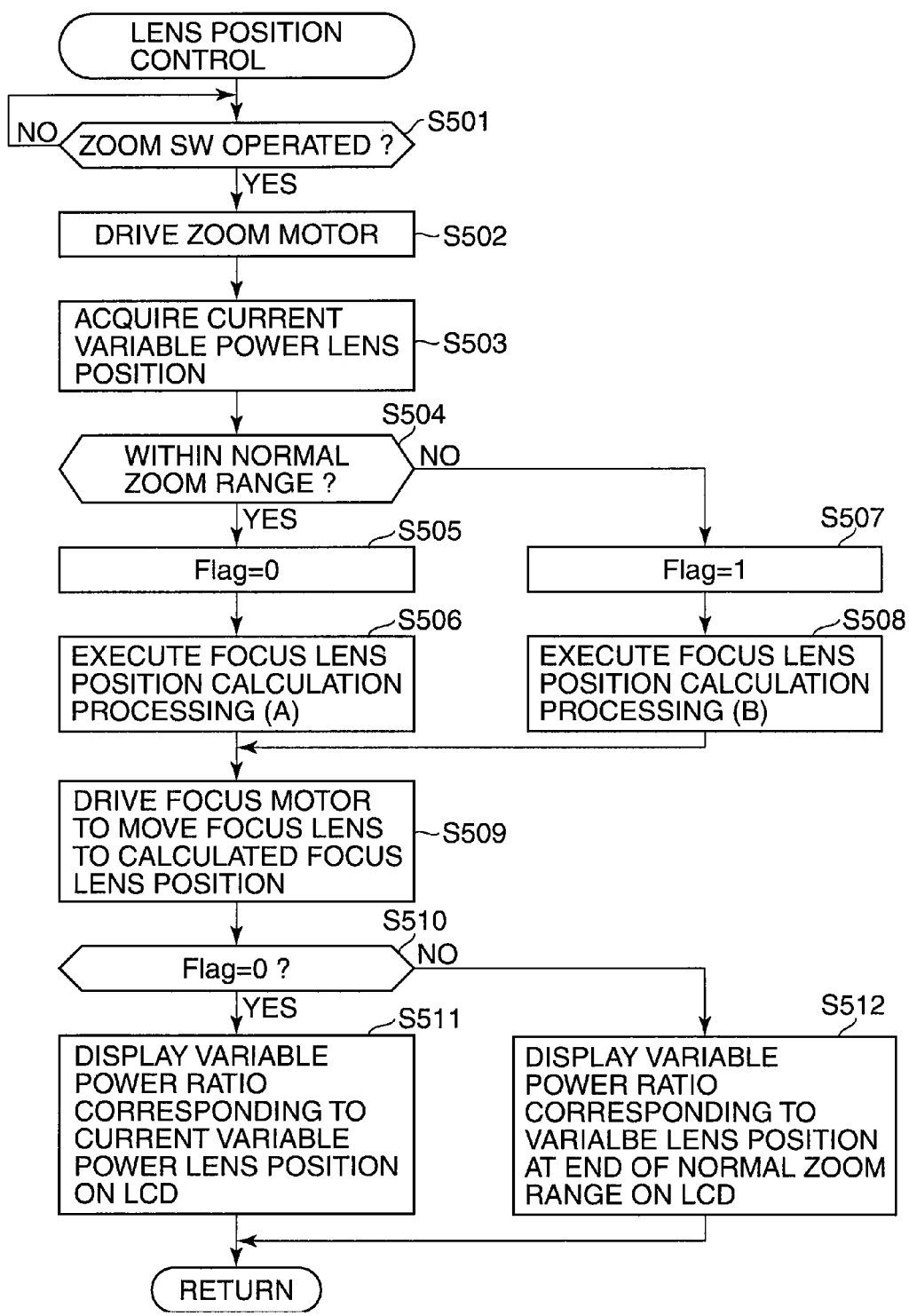
FIG. 2 is a flowchart of a lens position control process carried out by the digital camera in FIG. 1.

Next, a lens position control process carried out by the digital camera will be described with reference to FIG. 2.

The lens position control is kept on standby until the zoom switch 15 is operated by a user (NO to a step S501). When the zoom switch 15 is operated by the user (YES to the step S501), the system controller 11 drives the zoom motor 8 via the zoom control section 12 according to the state of the zoom switch 15 (step S502).

Then, the system controller 11 reads the present position of the variable power lens 1 as a result of the driving in the step S502 (step S503). Further, the system controller 11 determines whether or not the position of the variable power lens 1 read in the step S503 is within the normal zoom range (step S504).

Here, if it is determined that the position of the variable power lens 1 is within the normal zoom range (YES to the step S504), the process proceeds to a step S505, wherein an outside-zoom-range flag Flag indicating that the position of the variable power lens 1 is outside the normal zoom range is set to 0. Then, focus lens position calculation processing (A) is executed in a step S506.

In the focus lens position calculation processing (A), the system controller 11 performs the following calculations:

First, the system controller 11 calculates an interior division ratio based on three positions: the current variable power lens position $Z_n$, and two variable power lens positions $Z_m$ and $Z_{m-1}$ which are adjacent to the current variable power lens position $Z_n$ from opposite sides, out of those of the associated cam trajectory of the movement control information stored in the flash memory 14.

Further, the system controller 11 calculates a focus lens position $F_m$ (in-focus position) where focus can be achieved at the variable power lens position $Z_m$ acquired from the flash memory 14 and a focus lens position $F_{m-1}$ where focus can be achieved at the variable power lens position $Z_{m-1}$ acquired from the flash memory 14. Further, the system controller 11 calculates a focus lens position $F_n$ where focus can be achieved at the current variable power lens position $Z_n$ using the calculated interior division ratio, and sets the same as a target position of the focus lens 2.

Figure 3:
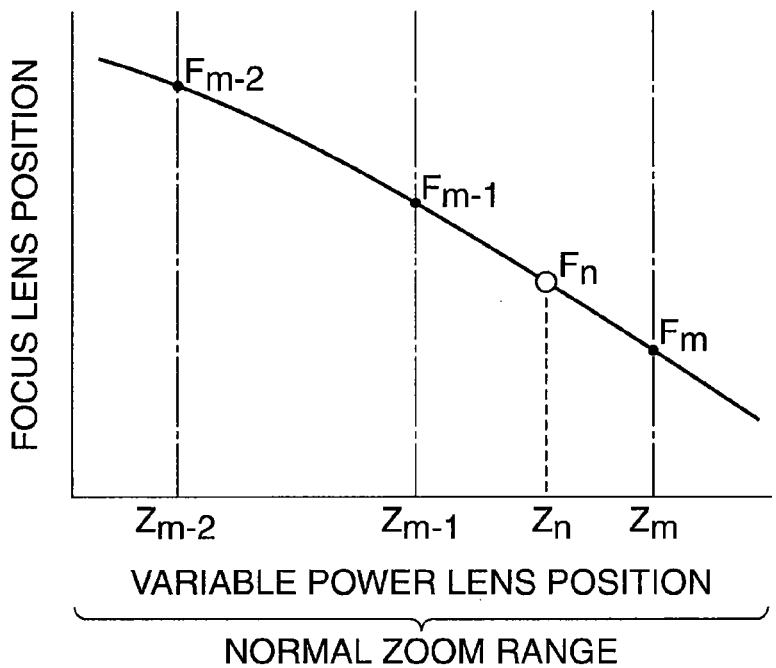
FIG. 3 is a diagram useful in explaining focus lens position calculation processing.

FIG. 3 illustrates the current variable power lens position $Z_n$, and stored variable power lens positions $Z_m$ and $Z_{m-1}$ which are adjacent to the current variable power lens position $Z_n$ from opposite sides, and further, the focus lens positions $F_m$ and $F_{m-1}$, where focus can be achieved at the respective variable power lens positions $Z_m$ and $Z_{m-1}$.

The interior division ratio of $Z_m$ and $Z_{m-1}$ by $Z_n$ is $(Z_n-Z_{m-1})/(Z_m-Z_{m-1})=\alpha/\beta$ (interpolation).

Therefore, the focus lens position $F_n$ where focus can be achieved at the current variable power lens position $Z_n$ becomes a position expressed by $F_n=\alpha/\beta*(F_m-F_{m-1})+F_{m-1}$, which interiorly divides $F_m$ and $F_{m-1}$ by the above-mentioned interior division ratio.

After the focus lens position calculation processing (A) in the step S506, the process proceeds to a step S509.

On the other hand, if it is determined in the step S504 that the position of the variable power lens is outside the normal zoom range (NO to the step S504), the process proceeds to a step S507, wherein the outside-zoom-range flag is set to 1 so as to indicate that the position of the variable power lens 1 is outside the normal zoom range.

Next, the process proceeds to a step S508, wherein focus lens position calculation processing (B) is executed.

In this focus lens position calculation processing (B), the system controller 11 performs the following calculations: First, the system controller 11 calculates an interior division ratio based on three positions: the current variable power lens position $Z_n$, a variable power lens position $Z_t$ at an end (wide-angle end or telephoto end) of the normal zoom range, which is closer to the current variable power lens position $Z_n$, out of those of the associated cam trajectory of the focus lens movement control information stored in the flash memory 14, and a variable power lens position $Z_p$ which is closer to the current variable power lens position $Z_n$, out of those of the outside-zoom-range in-focus position information.

Next, the focus lens position $F_n$ where focus can be achieved at the current variable power lens position $Z_n$ is calculated using the calculated interior division ratio, and a focus lens position $F_t$ where focus can be achieved at the variable power lens position $Z_t$ at the end of the normal zoom range and a focus lens position $F_p$ where focus can be achieved at the variable power lens position $Z_p$, which are acquired from the flash memory 14. The focus lens position $F_n$ determined as the result of the focus lens position calculation processing (B) is set as a target position of the focus lens 2.

Figure 4:
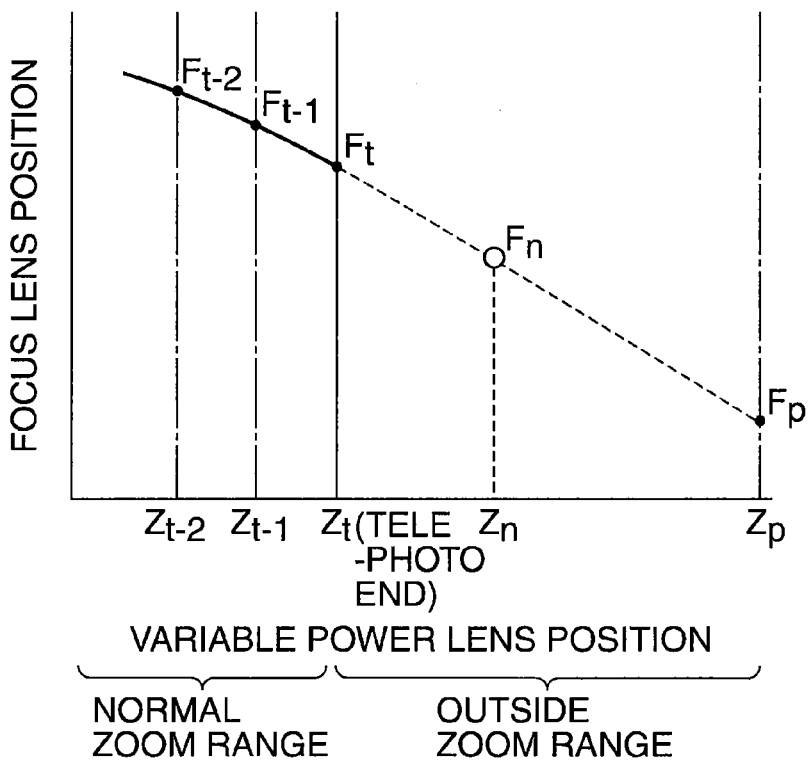
FIG. 4 is a diagram useful in explaining the focus lens position calculation processing.

FIG. 4 illustrates the current variable power lens position $Z_n$, the variable power lens position $Z_t$ at the end of the normal zoom range, which is closer to the current variable power lens position $Z_n$, out of those of the associated cam trajectory of the stored focus lens movement control information, and the position $Z_p$ which is closer to the current variable power lens position $Z_n$, out of those included in the outside-zoom-range in-focus position information.

When the focus lens positions where focus can be achieved at the respective variable power lens positions $Z_t$ and $Z_p$ are denoted by $F_t$ and $F_p$, the interior division ratio at which $Z_n$ interiorly divides $Z_p$ and $Z_t$ is expressed by $(Z_n-Z_t)/(Z_p-Z_t)=\alpha/\beta$ (interpolation).

Therefore, the focus lens position $F_n$ where focus can be achieved at the current variable power lens position $Z_n$ is expressed by $F_n=\alpha/\beta*(F_p-F_t)+F_t$, which interiorly divides $F_p$ and $F_t$ by the above-mentioned interior division ratio.

After the focus lens position calculation processing (B) in the step S508, the process proceeds to the step S509. In the step S509, the system controller 11 delivers the drive command to the focus control section 13 to move the focus lens 2 to the focus lens position $F_n$ calculated by the focus lens position calculation processing (A) in the step S506 or the focus lens position calculation processing (B) in the step S508.

Then, in a step S510, the system controller 11 determines whether or not the outside-zoom-range flag Flag is equal to 0. If it is determined that the outside-zoom-range flag Flag is equal to 0 (YES to the step S510), the process proceeds to a step S511, wherein a variable power ratio calculated from the current variable power lens position read by the system controller 11 is displayed on the LCD 7.

Further, if it is determined that the outside-zoom-range flag Flag is equal to 1, the process proceeds to a step S512, wherein a variable power ratio calculated from the variable power lens position Zt at the end (the wide-angle end or the telephoto end) of the normal zoom range, closer to the current variable power lens position $Z_n$, is displayed on the LCD 7, followed by terminating the lens position control process.

Although in the above-described first embodiment, the focus lens movement control information based on the cam trajectories and the outside-zoom-range in-focus position information are stored in the flash memory 14 as respective pieces of information different from each other, the outside-zoom-range in-focus position information may be included in the focus lens movement control information based on the cam trajectories and stored in the flash memory 14 as a single map.

Further, although in the first embodiment, the description has been given of the outside-zoom-range in-focus position information that stores in-focus position information both on the wide-angle side and the telephoto side, the outside-zoom-range in-focus position information may store in-focus position information on only one of the wide-angle side and the telephoto side.

Furthermore, in the first embodiment, the description has been given of the case where considering the capacity of the flash memory 14, the outside-zoom-range in-focus position information is formed of position information on one point beyond each of the wide-angle end and telephoto end of the normal zoom range, and the distance between the one point and the associated end of the normal zoom range is larger than the division width of each cam trajectory in the normal zoom range. However, the distance between each point outside the normal zoom range and the associated end of the normal zoom range is not necessarily required to be larger than the division width of each cam trajectory in the normal zoom range but may be configured to have a desired length, and there may be stored information on a plurality of points outside each end of the normal zoom range.

As described heretofore, according to the lens position control of the first embodiment, even when the variable power lens 1 is positioned outside the normal zoom range from the wide-angle end to the telephoto end, it is possible to maintain the in-focus state of an object image.

Next, a second embodiment of the present invention will be described. In the second embodiment, the flash memory 14 stores only the focus lens movement control information based on the cam trajectories. In other words, although in the first embodiment, the flash memory 14 stores the focus lens movement control information based on the cam trajectories and the outside-zoom-range in-focus position information, in the second embodiment, the flash memory 14 does not store the outside-zoom-range in-focus position information.

It should be noted that since the digital camera including the lens control device according to the second embodiment has the same configuration as described above with reference to FIG. 1, and hence description of the configuration thereof is omitted. Further, the lens position control process according to the second embodiment has the same procedure as illustrated in the FIG. 2, and hence the lens position control process executed in the second embodiment will be described with reference to FIG. 2.

The lens position control process is kept on standby until the zoom switch 15 is operated by the user (NO to the step S501). When the zoom switch 15 is operated by the user (YES to the step S501), the system controller 11 drives the zoom motor 8 via the zoom control section 12 according to the state of the zoom switch 15 (step S502).

Then, the system controller 11 reads the present position of the variable power lens 1 as a result of the driving in the step S502 (step S503). Further, the system controller 11 determines whether or not the present position of the variable power lens 1 read in the step S503 is within the normal zoom range (step S504).

Here, if it is determined that the position of the variable power lens is within the normal zoom range (YES to the step S504), the process proceeds to the step S505, wherein the outside-zoom-range flag Flag indicating that the position of the variable power lens 1 is outside the normal zoom range is set to 0. Further, focus lens position calculation processing (A) is executed in the step S506.

In the focus lens position calculation processing (A), the system controller 11 performs the following calculations:

First, the system controller 11 calculates an interior division ratio based on three points: the current variable power lens position $Z_n$, and two variable power lens positions $Z_m$ and $Z_{m-1}$ which are adjacent to the current variable power lens position $Z_n$ from opposite sides, out of those of the associated cam trajectory of the focus lens movement control information stored in the flash memory 14.

Next, the system controller 11 calculates a focus lens position $F_n$ where focus can be achieved at the present variable power lens position $Z_n$, and sets the focus lens position $F_n$ as a target position of the focus lens 2. This focus lens position $F_n$ is calculated using the above-described interior division ratio, a focus lens position $F_m$ where focus can be achieved at the variable power lens position $Z_m$ acquired from the flash memory 14 and a focus lens position $F_{m-1}$ where focus can be achieved at the variable power lens position $Z_{m-1}$ acquired from the flash memory 14.

FIG. 3 illustrates, as described hereinabove, the current variable power lens position $Z_n$, and stored variable power lens positions $Z_m$ and $Z_{m-1}$ which are adjacent to the current variable power lens position $Z_n$ from opposite sides, and further, the focus lens positions $F_m$ and $F_{m-1}$ where focus can be achieved at the respective variable power lens positions $Z_m$ and $Z_{m-1}$.

The interior division ratio of $Z_m$ and $Z_{m-1}$ by $Z_n$ is $(Z_n - Z_{m-1})/(Z_m - Z_{m-1}) = \alpha/\beta$ (interpolation).

Therefore, the focus lens position $F_n$ where focus can be achieved at the current variable power lens position $Z_n$ becomes a position expressed by $F_n = \alpha/\beta * (F_m - F_{m-1}) + F_{m-1}$, which interiorly divides $F_m$ and $F_{m-1}$ by the above-mentioned interior division ratio.

After the focus lens position calculation processing (A) in the step S506, the process proceeds to the step S510.

On the other hand, if it is determined in the step S504 that the position of the variable power lens is outside the normal zoom range (NO to the step S504), the process proceeds to the step S507, wherein the outside-zoom-range flag is set to 1 so as to indicate that the position of the variable power lens 1 is outside the normal zoom range.

Next, the process proceeds to the step S508, wherein focus lens position calculation processing (B) is executed.

In this focus lens position calculation processing (B), the system controller 11 performs the following calculations:

First, the system controller 11 calculates an exterior division ratio based on three positions: the current variable power lens position $Z_n$, a variable power lens position $Z_t$ at an end (wide-angle end or telephoto end) of the normal zoom range, which is closer to the current variable power lens position $Z_n$, out of those of the cam trajectories of the focus lens movement control information stored in the flash memory 14, and a variable power lens position $Z_{t-1}$ within the normal zoom range, which is adjacent to the variable power lens position $Z_t$ at the end of the normal zoom range.

Next, the focus lens position $F_n$ where focus can be achieved at the current variable power lens position $Z_n$ is calculated based on the calculated exterior division ratio, and a focus lens position $F_t$ where focus can be achieved at the variable power lens position $Z_t$ at the end of the normal zoom range and a focus lens position $F_{t-1}$ where focus can be achieved at the variable power lens position $Z_{t-1}$, which are acquired from the flash memory 14. The focus lens position $F_n$ determined as the result of the focus lens position calculation processing (B) is set as a target position of the focus lens 2.

FIG. 4 illustrates the current variable power lens position $Z_n$, the variable power lens position $Z_t$ at the end of the normal zoom range, which is closer to the current variable power lens position $Z_n$ stored as information on the cam trajectories, and the variable power lens position $Z_{t-1}$ within the normal zoom range, which is adjacent to the variable power lens position $Z_t$ at the end of the normal zoom range.

When the focus lens positions where focus can be achieved at the respective variable power lens positions $Z_t$ and $Z_{t-1}$ are denoted by $F_t$ and $F_{t-1}$, the exterior division ratio at which $Z_n$ interiorly divides $Z_t$ and $Z_{t-1}$ is expressed by $(Z_n - Z_{t-1})/(Z_t - Z_{t-1}) = \alpha/\beta$ (extrapolation).

Therefore, the focus lens position $F_n$ where focus can be achieved at the current variable power lens position $Z_n$ is expressed by $F_n = \alpha/\beta * (F_t - F_{t-1}) + F_{t-1}$, which exteriorly divides $F_t$ and $F_{t-1}$ by the above-mentioned exterior division ratio.

After the focus lens position calculation processing (B) in the step S508, the process proceeds to the step S510.

In the step S510, the system controller 11 determines whether or not the outside-zoom-range flag Flag is equal to 0. If it is determined that the outside-zoom-range flag Flag is equal to 0 (YES to the step S510), the process proceeds to a step S511, wherein a variable power ratio calculated from the current variable power lens position read by the system controller 11 is displayed on the LCD 7.

Further, if it is determined that the outside-zoom-range flag Flag is equal to 1, the process proceeds to a step S512, wherein a variable power ratio calculated from the variable power lens position Zt at the end (the wide-angle end or the telephoto end) of the normal zoom range, which is closer to the current variable power lens position $Z_n$, is displayed on the LCD, followed by terminating the lens position control process.

As described heretofore, according to the lens position control of the second embodiment, even when the variable power lens 1 is positioned outside the normal zoom range from the wide-angle end to the telephoto end, it is possible to maintain the in-focus state of an object image without the need to increase the capacity of the used flash memory 14.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2010-022090 filed Feb. 3, 2010, which is hereby incorporated by reference herein in its entirety.

What is claimed is:

1. A lens control device that controls movement of a first lens by a first drive unit to vary magnification of an object image, and controls movement of a second lens by a second drive unit to correct a change in an image forming position caused by the movement of the first lens, comprising:
  a storage unit configured to store a positional relationship between the first lens and the second lens, on an object distance-by-object distance basis; and
  a system controller configured to calculate, when the first lens is within a first range, a position of the second lens based on the stored positional relationship using a calculating method different from that used when the first lens is within a second range, and cause the second drive unit to move the second lens to the calculated position, wherein the second range is a range within the positional relationship stored in the storage unit, and the first range is a range outside the second range on a side of the telephoto end.

2. The lens control device according to claim 1, wherein said system controller calculates the in-focus position of the second lens with respect to the position of the first lens, based on information on a plurality of in-focus positions of the second drive lens defined in the positional relationship stored in said storage unit.

3. The lens control device according to claim 1, comprising a display unit configured to be controlled by said system controller such that when the first lens is moved to the position outside the normal zoom range, said display unit displays a state of magnification corresponding to one of the wide-angle end and the telephoto end, which is closer to the position outside the normal range.

4. A method of controlling a lens control device that stores a positional relationship between a first lens for varying magnification of an object image and a second lens for correcting a change in an image forming position caused by a movement of the first lens, on an object distance-by-object distance basis, in a storage unit, and controls respective movements of the first and second lenses, the method comprising:
  calculating, when the first lens is within a first range, a position of the second lens based on the stored positional relationship using a calculating method different from that used when the first lens is within a second range, thereby causing the second drive unit to move the second lens to the calculated position, wherein the second range is a range within the positional relationship stored in the storage unit, and the first range is a range outside the second range on a side of the telephoto end.

5. A non-transitory computer-readable storage medium storing a computer-executable program for causing a computer to execute a method of controlling a lens control device that stores a positional relationship between a first lens for varying magnification of an object image and a second lens for correcting a change in an image forming position caused by a movement of the first lens, on an object distance-by-object distance basis, in a storage unit, and controls respective movements of the first and second lenses,
  wherein the method comprises calculating, when the first lens is within a first range, a position of the second lens based on the stored positional relationship using a calculating method different from that used when the first lens is within a second range, thereby causing the second drive unit to move the second lens to the calculated position, wherein the second range is a range within the positional relationship stored in the storage unit, and the first range is a range outside the second range on a side of the telephoto end.

* * * * *